United States Patent [19]

Kronenberg

[11] 4,428,837

[45] Jan. 31, 1984

[54] FLUID TREATMENT DEVICE

[75] Inventor: Klaus J. Kronenberg, Claremont, Calif.

[73] Assignee: Trig International, Inc., Cardiff-by-the-Sea, Calif.

[21] Appl. No.: 312,612

[22] Filed: Oct. 19, 1981

[51] Int. Cl.³ .............................................. B03C 1/12
[52] U.S. Cl. .................................... 210/222; 210/223; 209/224
[58] Field of Search ................. 210/222, 223; 209/224

[56] References Cited

U.S. PATENT DOCUMENTS

| | | | |
|---|---|---|---|
| 2,652,925 | 9/1957 | Vermeiren | 210/223 |
| 2,825,464 | 3/1958 | Mack | 210/222 |
| 3,170,871 | 2/1965 | Moriya | 210/222 |
| 3,680,705 | 8/1972 | Happ et al. | 210/222 |
| 3,699,274 | 6/1972 | Happ et al. | 210/222 |
| 3,923,660 | 12/1975 | Kottmeier | 210/222 |
| 3,951,807 | 4/1976 | Sanderson | 210/222 |
| 4,146,479 | 3/1979 | Brown | 210/222 |
| 4,157,963 | 6/1979 | Jessop et al. | 210/222 |
| 4,188,296 | 2/1980 | Fujita | 210/222 |
| 4,210,535 | 6/1980 | Risk | 210/222 |
| 4,216,092 | 8/1980 | Shalhoob et al. | 210/222 |
| 4,265,754 | 5/1981 | Menold | 210/222 |
| 4,265,755 | 5/1981 | Zimmerman | 210/222 |

FOREIGN PATENT DOCUMENTS

| | | | |
|---|---|---|---|
| 264377 | 12/1963 | Australia | 210/222 |
| 1218963 | 6/1966 | Fed. Rep. of Germany | 210/222 |

*Primary Examiner*—Peter A. Hruskoci
*Assistant Examiner*—Sharon T. Cohen
*Attorney, Agent, or Firm*—Leo R. Carroll

[57] ABSTRACT

This invention provides an improved apparatus for the treatment of water to reduce the formation of scale in those mechanical devices that employ water and to enhance the service ability of liquids in other applications through the use of magnetic circuitry which maximizes the effectiveness of the magnetic flux upon fluids. The circuitry includes flat-ring true permanent magnets, collector disks with tapered transmission points, set air gaps and threaded concentrator cores. This invention makes it possible to tailor magnet spacing to meet a wide range of velocity and flow rate requirements through the use of flux separators of varying sizes and the interchangeability of the inner core.

6 Claims, 4 Drawing Figures

FLUID TREATMENT DEVICE

BACKGROUND OF THE INVENTION

This invention relates generally to hydromagnetic devices and more particularly to a device in which scale-forming minerals in a fluid are more efficiently crystallized and precipitated within the fluid. In addition to water softening, prior crystallization on the pipes and walls of equipment is reduced, thereby improving fluid flow and heat transfer while reducing energy consumption and maintainance costs. It has been found that certain very specific conditions are required in order to improve efficiency. The fluid must pass through magnetic flux fields at such flow rates and velocities that the liquid experiences appropriately spaced alternating and reinforcing flux densities to the correct intensity to treat the substances.

Numerous magnetic devices and/or systems have been proposed and are in use for the purpose of water treatment. Typical designs patented to Vermeiren in U.S. Pat. No. 2,652,925, to Mack in U.S. Pat. No. 2,825,464, and to Sanderson in U.S. Pat. No. 3,951,807 have in common devices that include several opposed permanent magnets which provide what is technically known as magnetic stray fields for the liquid to pass. Even though each of the above is essentially a concentric arrangement, the flux density and, consequently, the treatment of the fluid varies from location to location within the device because of this dependence upon stray fields. To compensate for distortion and bias of the fields, some devices rotate the fluid path to cut lines of force in a more orthoganal manner. Devices such as patented to Kottmeier in U.S. Pat. No. 3,923,660, and to Kottmeier and Happ in U.S. Pat. No. 3,669,274 and 3,680,705 utilize a helical path for such an improvement. Brown in U.S. Pat. No. 4,146,479 provides disc type magnets which may be individually rotated to improve flux line cutting. Devices such as U.S. Pat. No. 4,157,963 to Jessop et.al. implant their device in a non flowing liquid tank, while U.S. Pat. No. 4,210,535 to Risk, U.S. Pat. No. 4,265,754 to Menold, and U.S. Pat. No. 4,265,755 to Zimmerman fasten to the outside of fluid conducting tubes and provide unsymmetrical conditioning as the greatest amount of the fluid flows through the center of the conduit where the flux densities are either nonexistent or are the weakest. In a similar clampon apparatus, Fujita in U.S. Pat. No. 4,188,296, varies field strength by adjusting air gap spacing in an application of magnetic fields to finer dispersal of dust and oil particles in fuels prior to combustion.

The device patented by Shalhoob contains a concentric arrangement of magnetic fields that increases the flow velocity of the water at the poles of the permanent magnets by reducing the cross section of the water flow thusly accelerating the fluid flow at the magnetic poles. A ferrous rod and washers are included to concentrate the magnetic flux at the poles. Although several of the references cited show knowledge of the importance of obtaining maximum fluid exposure to a high flux density, none touch the importance of the spacial distribution of repeated exposures to highly concentrated fields. It has been found herein that performance can be improved by changing the repetitive alternating field exposure time and spacial cutting rate as a function of fluid velocity.

SUMMARY OF THE INVENTION

The source of magnetic flux within this circuit is created and maintained by true permanent magnetic materials of the ferrite type. Ferrite magnets possess coercive force of such magnitude that they are safe from their own magnetic induction, that of other materials and from accident. Flat ring type magnets were chosen because a higher magnetic flux density is obtainable within the inner diameter of magnets than around their perimeter.

By collecting the flux lines from the pole areas of the magnets in flat collector rings of soft magnetic materials and concentrating those lines down to a very narrow cross section before transmitting them across the fluid path to an equally defined receiver, the stray fields are virtually eliminated and the effectiveness of the magnetic field greatly increased.

The magnetic circuit starts with flat ring type magnets, a collector ring collects and condenses the flux lines from the magnet poles and transmits those flux lines across the fluid path to the concentrator core in the center of the assembly. The flux lines then flow from the concentrator core back across the fluid path to the opposite collector ring, and the circuit is completed by returning the flow lines back through the magnet. A concentrator can may be added to the outside diameter of the assembly to collect the stray fields at that point and direct the force by way of the collector rings to the inner diameter to increase the flux density to even a greater extent.

The amount of time a given quantity of fluid is exposed to magnetic fields is important to its treatment. This invention with its short individual magnet exposure time makes it possible to increase the inpulse flux cutting freuency for higher velocity streams by tailoring of its flux separators.

This invention restricts the liquid flow to an annular cross section to insure a uniform exposure to the magnetic fields as it is known that the velocity of fluids flowing through an open tube increases parabolically toward the center of the tube resulting in a wide variety of flow rates at different locations of the cross section. It is a primary object of this invention therefore to provide an improved device for enhancing crystallization and precipitation of scale-forming minerals in a fluid stream by repeat exposure to narrow multiple spaced apart alternating magnetic fields.

It is further object to provide such spaced multiple exposures in a device in which the spacing between magnets may be adjusted to optimize efficiency at specified flow rates.

It is further object to provide a device in which individual magnetic exposure time is reduced by use of magnetic concentrator rings to narrow flux distribution.

It is a further object to provide a more uniform magnetic exposure by use of flat disc magnets operating on an annular fluid cross section.

It is a further object to provide a more efficient magnetic circuit in which stray flux lines are minimized by providing a definite magnetic flow path.

It is a further object to provide a device in which variations in exposure time is reduced by reducing the variation in fluid velocity across the fluid cross section.

DESCRIPTION OF THE INVENTION

With the following description of the configuration and operation of the fluid treatment device reference shall be made to the drawings FIG. 1, FIG. 2, FIG. 3, and FIG. 4. Such references to the figures are not intended to limit the scope of the claimed invention, but rather are illustrative of the principles of the invention. Further embodiments will be considered within the description.

Figure 1:
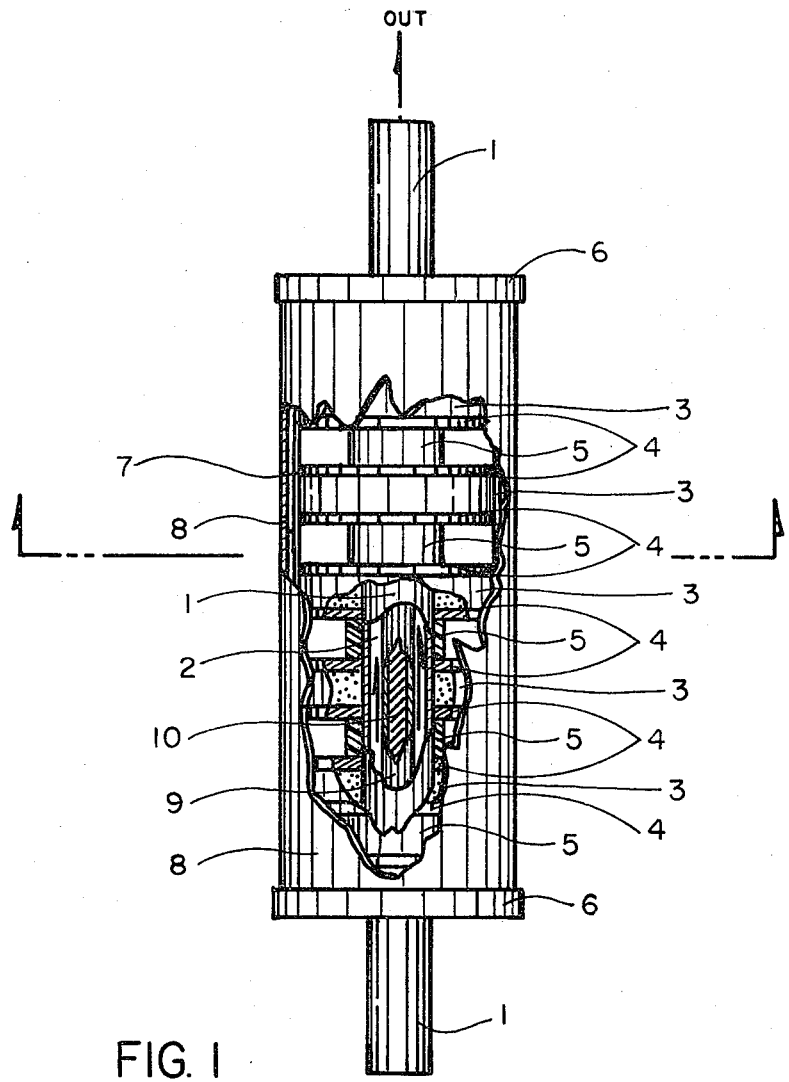
FIG. 1, represents a fragmentary side view of the fluid treatment device.
Figure 2:
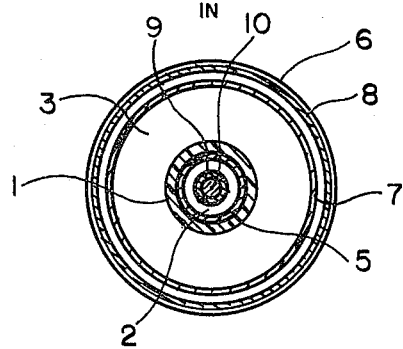
FIG. 2, represents a cross section view of the fluid treatment device.

Referring now to FIGS. 1 and 2, the fluid treatment device is shown to be comprised of a cylindrical conduction tube 1 of nonferrous materials through which the liquid 2 is passed. Around this tube is placed a polarity of flat ring permanent magnets 3. Collector disks 4 of soft steel are positioned on each face of the magnets. Each of the magnet collector disk assemblies is separated from the next with nonferrous flux separators 5. A ferrous collector 7 may be fitted around the outside of and in contact with the sharpened edges of collector rings. A nonferrous, cylindrical sleeve 8 is located over the assembly and end caps 6 snapped in place to form a protecting covering.

Inside the fluid conductor tube is concentrically located a nonferrous concentrator core tube 9 of smaller diameter than the fluid conduction tube 1. The difference between the outside diameter of this concentrator core tube 9 and the inside diameter of the fluid conduction tube 1 determines the cross section of fluid 2 that flows through the device. Inside the concentrator core tube 9 is located a threaded soft steel or other soft magnetic material concentrator core 10.

Figure 3:
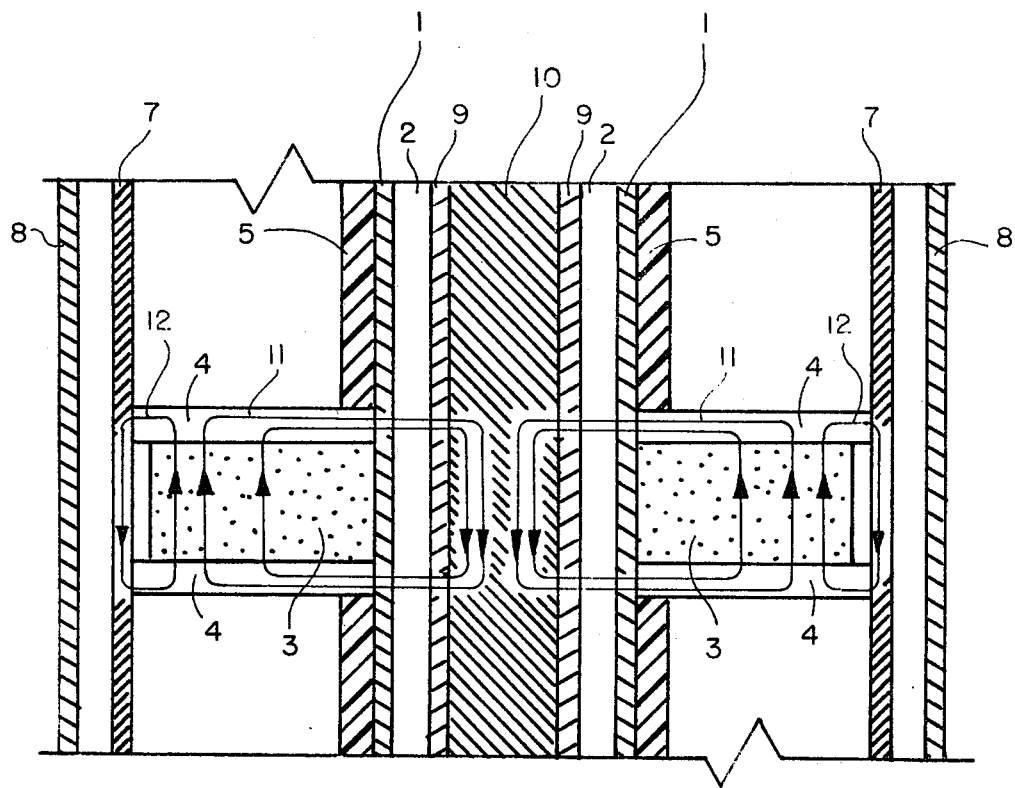
FIG. 3, represents the magnetic flow through the magnetic circuit.

FIG. 3 describes the magnetic circuit. It shows the inner flux lines 11 being transmitted from the magnets 3 through the collector disks 4 across the fluid path 2 to the concentrator core 10 and then back to the magnet 3. The outer flux lines 12 originate in the magnet 3, go through the collector disk 4 to the concentrator can 7 and back to the magnet.

Figure 4:
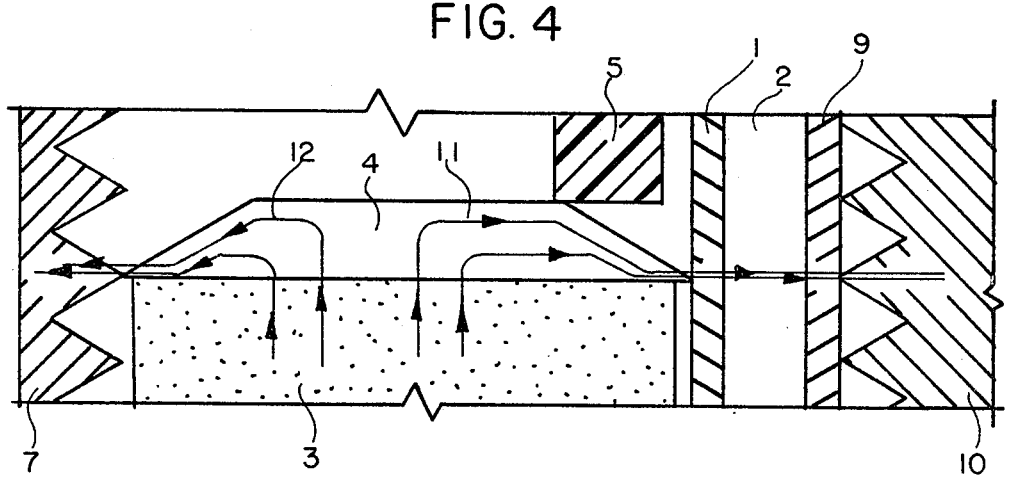
FIG. 4, represents a half cross section view of the effect of tapering the edges of the collector disks and concentrator can and core.

FIG. 4 depicts the collecting and concentrating effect of the tapered transmission points of the collector disks 4, concentrator can 7 and concentrator core 10. It is to be understood that the foregoing description is merely illustrative of the preferred embodiment of the invention and that the scope of the invention is not to be limited thereto, but is to be determined by the scope of the appended claims.

On such premises I claim:

1. A magnetic fluid treatment device to maximize the reduction of mineral deposits within a fluid pipe at a particular fluid velocity, comprising:
    a non-magnetic cylindrical fluid conduction tube within which the fluid to be treated flows;
    an external inlet and outlet attachment means to support and connect said fluid conduction tube to an external fluid supply source;
    an elongated hollow non-magnetic concentrator core tube positioned within said fluid conduction tube and spaced therefrom to form an annular chamber therebetween for axial fluid passage;
    a ferrous soft magnetic concentrator core tightly contained within said concentrator core tube and extending throughout its axial length;
    a plurality of spaced apart magnetic members of alternating polarity, each consisting of a flat ring magnet positioned between a pair of side magnetic collector disks, whereby magnetic flux lines are communicated axially between the faces of said magnet and said disks and radially between said disks and said concentrator core;
    a ferrous soft magnetic concentrator can closely spaced coaxially around said magnetic members whereby magnetic flux lines are communicated axially between the faces of said magnet and said disks and radially between said disks and said concentrator can; and
    a plurality of adjustably sized non-magnetic flux separators whereby the spacing between said magnetic members may be tailored to increase treatment efficiency at a specified flow rate.

2. A magnetic fluid treatment device as recited in claim 1, further comprising:
    a nonferrous cylindrical protective sleeve positioned axially around said spaced apart magnetic members and having removable and caps attached thereto in sealed connection with said fluid conduction tube ends outboard of all said magnetic members.

3. A magnetic fluid treatment device as recited in claim 2 wherein said flat ring magnets are permanent ferrite magnets.

4. A magnetic fluid treatment device as recited in claim 3 wherein said concentrator core is externally threaded to increase flux density normal to the fluid flow by limiting the axial flux dimension.

5. A magnetic fluid treatment device as recited in claim 4 wherein said concentrator can is internally threaded to increase flux density between said can and said collector disks.

6. A magnetic fluid treatment device as recited in claim 5 wherein said collector disk outer and inner edges are sharpened adjacent to said concentrator can and said concentrator core threads to further increase flux density between said magnetic elements.

* * * * *